(12) United States Patent
Ohmura (10) Patent No.: US 11,137,953 B2
(45) Date of Patent: Oct. 5, 2021

(54) IMAGE FORMING APPARATUS WITH EFFICIENT SHEET REMOVAL FROM PURGED SHEET STORAGE

(71) Applicant: Kohki Ohmura, Kanagawa (JP)

(72) Inventor: Kohki Ohmura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/800,726

(22) Filed: Feb. 25, 2020

(65) Prior Publication Data
US 2020/0285422 A1   Sep. 10, 2020

(30) Foreign Application Priority Data

Mar. 7, 2019 (JP) .............................. JP2019-041334

(51) Int. Cl.
*G06F 3/12* (2006.01)
(52) U.S. Cl.
CPC ............ *G06F 3/121* (2013.01); *G06F 3/1207* (2013.01); *G06F 3/1234* (2013.01); *G06F 3/1267* (2013.01)
(58) Field of Classification Search
None
See application file for complete search history.

(56) References Cited

U.S. PATENT DOCUMENTS

| | | | |
|---|---|---|---|
| 10,406,844 B1* | 9/2019 | Hayes | B65H 37/04 |
| 2009/0073514 A1 | 3/2009 | Shoji et al. | |
| 2011/0210506 A1* | 9/2011 | Yamazaki | B65H 7/02 |
| | | | 271/265.04 |
| 2016/0039627 A1* | 2/2016 | Maeda | G03G 21/16 |
| | | | 271/288 |
| 2018/0210389 A1* | 7/2018 | Konishi | G06F 3/1259 |
| 2019/0332337 A1* | 10/2019 | Matsumae | G06F 3/1219 |

FOREIGN PATENT DOCUMENTS

JP   58-025656   2/1983

* cited by examiner

*Primary Examiner* — Miya J Williams
(74) *Attorney, Agent, or Firm* — Duft & Bornsen, PC (57) ABSTRACT

An image forming apparatus includes a storage, circuitry, and an information provider. The storage is configured to temporarily store one or more sheets to be removed without being used in the image forming apparatus. The circuitry is configured to determine whether a manual operation is performed on the image forming apparatus and whether the one or more sheets stored in the storage exceed a given value in number or height. The information provider is configured to provide information urging removal of the one or more sheets from the storage in response to determination by the circuitry that the manual operation is performed and that the one or more sheets stored in the storage exceed the given value in number or height.

6 Claims, 7 Drawing Sheets

IMAGE FORMING APPARATUS WITH EFFICIENT SHEET REMOVAL FROM PURGED SHEET STORAGE

CROSS-REFERENCE TO RELATED APPLICATION

This patent application is based on and claims priority pursuant to 35 U.S.C. § 119(a) to Japanese Patent Application No. 2019-041334, filed on Mar. 7, 2019, in the Japan Patent Office, the entire disclosure of which is hereby incorporated by reference herein.

BACKGROUND

Technical Field

Embodiments of the present disclosure generally relate to an image forming apparatus for forming an image on a recording medium, and more particularly, to an image forming apparatus including a storage that temporarily stores a sheet to be removed without being used in the image forming apparatus.

Related Art

In an image forming apparatus such as a copier or a printer, a sheet (as a recording medium) that has failed to be conveyed due to, e.g., a paper jam during an image forming operation is typically conveyed to a storage (as a conveyance-defective sheet evacuation part) and temporarily stored in the storage. The image forming apparatus provided with the storage (as a conveyance-defective sheet evacuation part) performs the image forming operation while the storage stores unnecessary sheets. Before the storage is filled with sheets, a user removes the sheets resting in the storage from the image forming apparatus (more particularly, from the storage).

SUMMARY

In one embodiment of the present disclosure, a novel image forming apparatus includes a storage, circuitry, and an information provider. The storage is configured to temporarily store one or more sheets to be removed without being used in the image forming apparatus. The circuitry is configured to determine whether a manual operation is performed on the image forming apparatus and whether the one or more sheets stored in the storage exceed a given value in number or height. The information provider is configured to provide information urging removal of the one or more sheets from the storage in response to determination by the circuitry that the manual operation is performed and that the one or more sheets stored in the storage exceed the given value in number or height.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. Also, identical or similar reference numerals designate identical or similar components throughout the several views.

DETAILED DESCRIPTION

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

It is to be noted that, in the following description, suffixes Y, M, C, and K denote colors of yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below.

Figure 1:
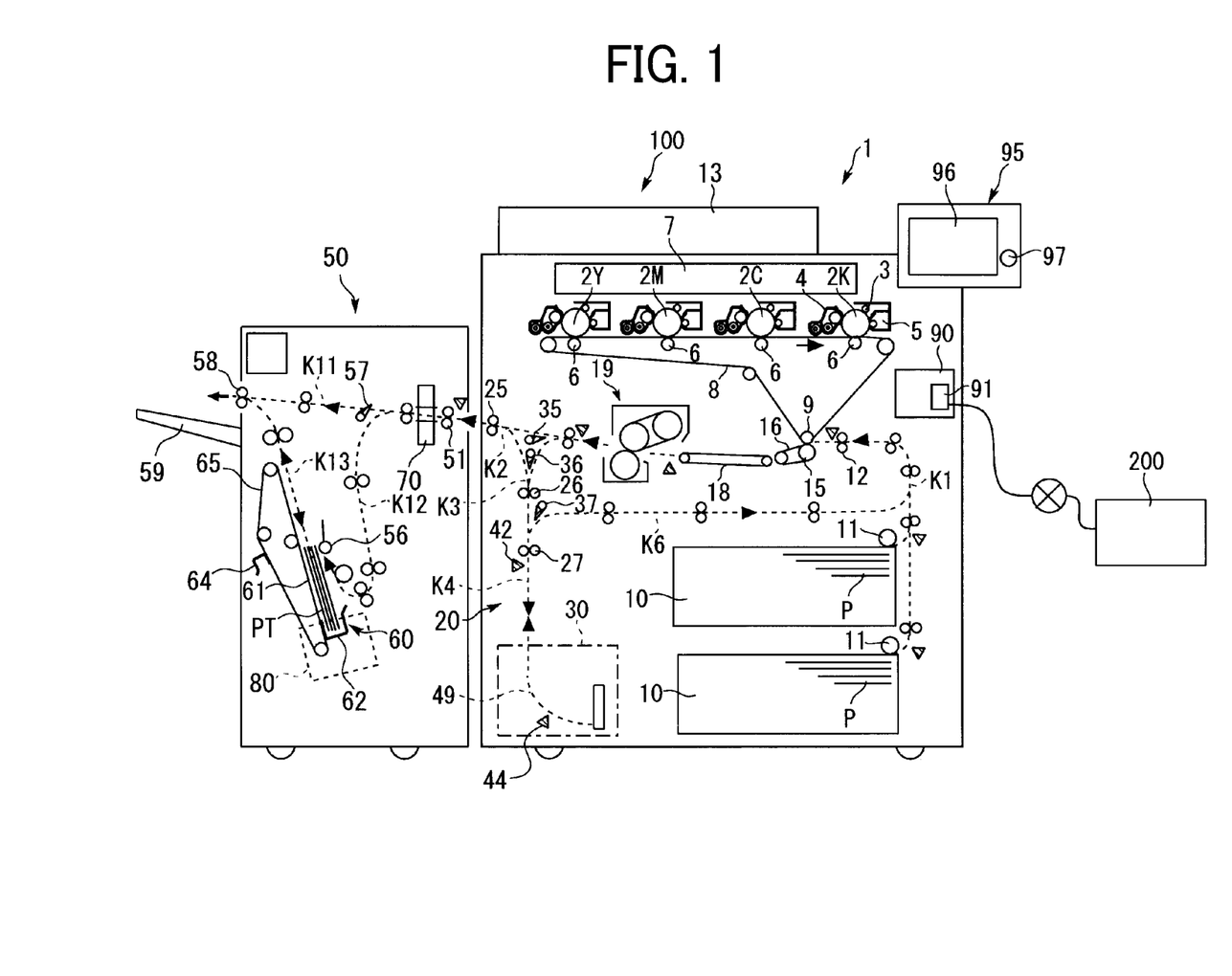
FIG. 1 is a schematic view of an image forming system including an image forming apparatus according to an embodiment of the present disclosure.

Initially with reference to FIG. 1, a description is given of overall configuration and operation of an image forming system 100 according to an embodiment of the present disclosure.

FIG. 1 is a schematic view of the image forming system 100 including an image forming apparatus 1.

In the present embodiment, the image forming system 100 is constructed of the image forming apparatus 1 and a post-processing device 50 removable from the image forming apparatus 1.

The image forming apparatus 1 is herein a color image forming apparatus. Specifically, the image forming apparatus 1 is a multifunction peripheral (MFP) having copying, printing and scanning functions (also referred to as a copier function, a printer function, and a scanner function). A personal computer 200 as a remote input device is connected to the image forming apparatus 1 via a network. A user, for example, uses the personal computer 200 to issue or input various commands to the image forming apparatus 1 through communication to cause the image forming apparatus 1 to perform desired printing (i.e., image forming operation). The user may manually operate an operation key 97 and operation buttons displayed on a screen 96 of an operation display panel 95 to issue or input various commands to cause the image forming apparatus 1 to perform desired printing (i.e., image forming operation) or simply scan a document.

The image forming apparatus 1 includes a conveying device 20 that conveys a sheet P, of which the conveyance has been stopped due to, e.g., a paper jam and staying in the image forming system 100, toward a storage 30 serving as a purger to purge the staying sheet P from a conveyance passage defined by internal components of the image forming system 100.

As illustrated in FIG. 1, a scanner 13 as a document reader is provided in an upper portion of the image forming apparatus 1 to optically read image data of a document. An intermediate transfer belt 8 is provided above the center of the image forming apparatus 1. Drum-shaped photoconductors 2Y, 2M, 2C and 2K as image forming devices are arranged side by side, facing the intermediate transfer belt 8, to form toner images of yellow, magenta, cyan and black, respectively. The intermediate transfer belt 8 presses against a secondary transfer roller 15 via a secondary transfer belt 16 below a loop formed by the intermediate transfer belt 8 to form an area of contact, herein referred to as a secondary transfer nip, as an image forming part between the intermediate transfer belt 8 and the secondary transfer belt 16.

As illustrated in FIG. 1, the photoconductor 2K is surrounded by various pieces of equipment, such as a charger 3, a developing device 4, a cleaner 5, and a charge neutralizer, to form a black toner image. A series of image forming processes, namely, charging, exposure, developing, primary transfer, cleaning, and charge neutralizing processes are performed on the photoconductor 2K. Accordingly, the black toner image is formed on the surface of the photoconductor 2K.

Similarly, each of the other photoconductors 2Y, 2M, and 2C is surrounded by various pieces of equipment, such as the charger 3, the developing device 4, the cleaner 5, and the charge neutralizer. The series of image forming processes are performed on each of the photoconductors 2Y, 2M, and 2C. Accordingly, yellow, magenta, and cyan toner images are formed on the surfaces of the photoconductors 2Y, 2M, and 2C, respectively. A description is now given of the series of image forming processes performed on the photoconductor 2K as a representative of the photoconductors 2Y, 2M, 2C and 2K.

The photoconductor 2K is rotated by a main motor in a counterclockwise direction in FIG. 1. The surface of the photoconductor 2K is uniformly charged at a position opposite the charger 3 in the charging process.

The photoconductor 2K is rotated further and reaches a position opposite an exposure device 7, where the surface of the photoconductor 2K is irradiated with laser light emitted from the exposure device 7 and scanned in a width direction, which is a main scanning direction perpendicular to the surface of the paper on which FIG. 1 is drawn. Accordingly, an electrostatic latent image corresponding to black is formed on the surface of the photoconductor 2K in the exposure process.

Note that, in a case in which the image forming apparatus 1 is used as a copier, the exposure device 7 irradiates the surface of the photoconductor 2K with the laser light according to image data of a document read by the scanner 13, to form a latent image on the surface of the photoconductor 2K. By contrast, in a case in which the image forming apparatus 1 is used as a printer, the exposure device 7 irradiates the surface of the photoconductor 2K with the laser light according to image data transmitted from the personal computer 200, to form a latent image on the surface of the photoconductor 2K. Alternatively, in a case in which the image forming apparatus 1 is used simply as a scanner, a controller 90 retains image data of a document read by the scanner 13. The image data is transmitted to the personal computer 200 or displayed on the screen 96 of the operation display panel 95.

After the electrostatic latent image is formed on the surface of the photoconductor 2K, the photoconductor 2K is rotated further and reaches a position opposite the developing device 4, where the electrostatic latent image is developed into a visible toner image of black in the developing process.

The photoconductor 2K is rotated further and reaches a position opposite the primary transfer roller 6 via the intermediate transfer belt 8, where the toner image is primarily transferred from the photoconductor 2K onto the intermediate transfer belt 8 in the primary transfer process. At this time, a small amount of toner may remain untransferred on the surface of the photoconductor 2K as residual toner.

Thereafter, the photoconductor 2K is further rotated and reaches a position opposite the cleaner 5, where the residual toner on the surface of the photoconductor 2K is collected by a cleaning blade into the cleaner 5 in the cleaning process.

The photoconductor 2K is rotated further and finally reaches a position opposite the charge neutralizer, where the residual potential is removed from the surface of the photoconductor 2K.

Thus, the series of image forming processes performed on the surface of the photoconductor 2K is completed.

Note that the series of image forming processes described above is performed on the surface of each of the other photoconductors 2Y, 2M, and 2C in substantially the same manner as the series of image forming processes performed on the photoconductor 2K. Accordingly, yellow, magenta, and cyan toner images are formed on the surfaces of the photoconductors 2Y, 2M, and 2C, respectively.

The yellow, magenta, cyan, and black toner images are primarily transferred from the photoconductors 2Y, 2M, 2C, and 2K, respectively, onto the intermediate transfer belt 8 while being superimposed one atop another as a color toner image on the intermediate transfer belt 8.

Thereafter, the intermediate transfer belt 8 bearing the color toner image reaches a position opposite the secondary transfer roller 15 via the secondary transfer belt 16. At this position, a secondary transfer opposed roller 9 sandwiches the intermediate transfer belt 8 and the secondary transfer belt 16 with the secondary transfer roller 15 to form the secondary transfer nip as an image forming part between the intermediate transfer belt 8 and the secondary transfer belt 16. At the secondary transfer nip, the color toner image is secondarily transferred from the intermediate transfer belt 8 onto a sheet P serving as a recording medium conveyed into the secondary transfer nip, in a secondary transfer process. At this time, a small amount of toner may remain untransferred on the intermediate transfer belt 8 as residual toner.

Thereafter, the intermediate transfer belt 8 reaches a position opposite an intermediate transfer cleaner. At this position, the intermediate transfer cleaner removes extraneous matter such as the residual toner adhering to the surface of the intermediate transfer belt 8.

Thus, a series of transfer processes performed on the surface of the intermediate transfer belt 8 is completed.

With continued reference to FIG. 1, the sheet P is conveyed from one of sheet feeders disposed in a lower portion of the image forming apparatus 1 to the secondary transfer nip (i.e., image forming part) via a conveyance passage K1 along which sheet feeding rollers 11, a registration roller pair 12, and the like are disposed.

Specifically, each of the sheet feeders 10 accommodates a plurality of sheets P serving as recording media resting one atop another. One of the sheet feeding rollers 11 is rotated in the counterclockwise direction in FIG. 1 to pick up and feed an uppermost sheet P of the plurality of sheets P toward between rollers of the registration roller pair 12 via the conveyance passage K1.

The sheet P thus conveyed to the registration roller pair 12 temporarily stops at an area of contact, herein referred as a roller nip, between the rollers of the registration roller pair 12 that stops rotating. Rotation of the registration roller pair 12 is timed to convey the sheet P toward the secondary transfer nip (i.e., image forming part) such that the sheet P meets the color toner image on the intermediate transfer belt 8 at the secondary transfer nip. Thus, the desired color toner image is transferred onto the sheet P.

The sheet P bearing the color toner image is then conveyed on the secondary transfer belt 16. After being separated from the secondary transfer belt 16, the sheet P is conveyed on a conveyor belt 18 to a fixing device 19. In the fixing device 19, the color toner image is fixed onto the sheet P under heat and pressure from a fixing belt and a pressure roller in a fixing process.

Thereafter, the sheet P bearing the fixed toner image is conveyed through an output conveyance passage K2 and ejected by an output roller pair 25 outside the image forming apparatus 1.

The sheet P thus discharged from the image forming apparatus 1 is then conveyed into the post-processing device 50 and subjected to post-processing such as punching and binding in the post-processing device 50. The sheet P (or a bundle of sheets PT) thus post-processed is discharged onto an output tray 59. A detailed description of the configuration and operation of the post-processing device 50 is deferred.

Thus, a series of image forming processes (i.e., image forming operation) of the image forming apparatus 1 is completed.

Figure 2:
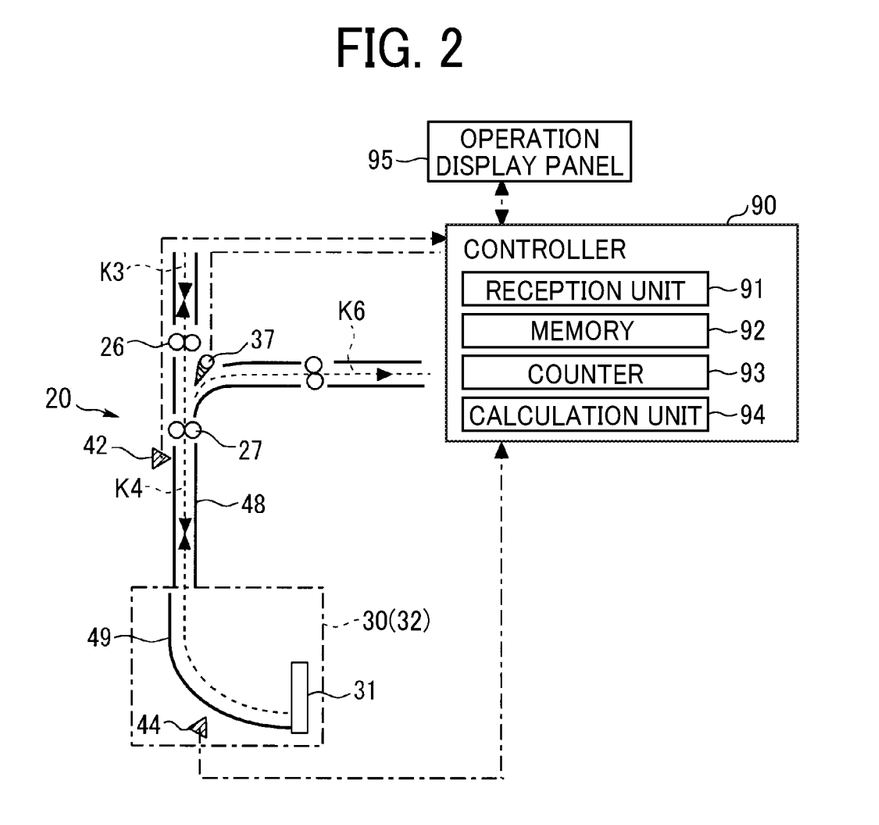
FIG. 2 is a diagram of a storage and surrounding components in the image forming apparatus.

Referring now to FIGS. 1 and 2, in a case in which a "duplex print mode" is selected to perform printing on both surfaces (i.e., front and back surfaces) of the sheet P, the sheet P bearing the fixed image on the front surface is directed to a vertical conveyance passage K3 by movement of a first switching claw 35 and a second switching claw 36, instead of being discharged from the image forming apparatus 1 after the fixing process, unlike the aforementioned case in which a simplex print mode is selected. The sheet P thus directed to the vertical conveyance passage K3 is then directed to a conveyance passage K4 by movement of a third switching claw 37. On the conveyance passage K4, the sheet P is conveyed backwards by the rotation of a second reversing roller pair 27 switched from a forward rotation to a reverse rotation. Then, the sheet P is directed to a lateral conveyance passage K6 by the movement of the third switching claw 37. The sheet P thus directed to the lateral conveyance passage K6 is conveyed again toward the secondary transfer nip (i.e., image forming part). At the secondary transfer nip, the aforementioned image forming process (i.e., image forming operation) is performed to form another toner image on the back surface of the sheet P. The sheet P is then conveyed to the fixing device 19, which fixes the toner image on the back surface of the sheet P. The sheet P bearing the fixed toner images on both surfaces is then discharged from the image forming apparatus 1 via the output conveyance passage K2.

In short, in a case in which the "duplex print mode" is selected, the vertical conveyance passage K3, the conveyance passage K4, and the lateral conveyance passage K6 collectively function as a duplex-printing conveyance passage.

In a case in which a "reverse discharge mode" is selected to reverse the front and back surfaces of the sheet P and discharge the sheet P thus reversed, the sheet P bearing the fixed image on the front surface (or each of the front and back surfaces) is directed to the vertical conveyance passage K3 by the movement of the first switching claw 35 and the second switching claw 36, instead of being discharged from the image forming apparatus 1 after the fixing process. Then, a leading end of the sheet P thus directed to the vertical conveyance passage K3 is directed to the conveyance passage K4 by the movement of the third switching claw 37. Then, the sheet P having the lead end directed to the conveyance passage K4 is conveyed backwards by the rotation of a first reversing roller pair 26 switched from a forward rotation to a reverse rotation. Then, the sheet P is directed to the output conveyance passage K2 via the vertical conveyance passage K3 by the movement of the second switching claw 36. The sheet P thus reversed is then discharged from the image forming apparatus 1 via the output conveyance passage K2.

In short, in a case in which the "reverse discharge mode" is selected, the vertical conveyance passage K3, the conveyance passage K4, and the output conveyance passage K2 collectively function as a reverse discharge passage.

Note that the "simplex print mode", the "duplex print mode", and the "reverse discharge mode" are selected by, e.g., a user through the operation display panel 95, which is disposed as an exterior part of the image forming apparatus 1.

With continued reference to FIG. 1, a detailed description is now given of the post-processing device 50.

First, the sheet P discharged from the image forming apparatus 1 is fed or conveyed into the post-processing device 50 by an entrance roller pair 51.

In a case in which a "general processing mode" is selected in advance by, e.g., a user through the operation display panel 95, a switching claw 57 switches the conveyance passages to direct the sheet P to a linear conveyance passage K11 so that the sheet P is directly ejected onto the output tray 59 by an output roller pair 58.

At this time, in a case in which "punching" is additionally selected in advance by the user through the operation display panel 95, a punching unit 70 punches the sheet P passing through the punching unit 70.

In a case in which "sorting" is additionally selected in advance by the user through the operation display panel 95, the output roller pair 58 serving as a sorter moves in a width direction to sort and discharge the sheets P onto the output tray 59.

By contrast, in a case in which a "binding mode" is additionally selected in advance by the user through the operation display panel 95 of the image forming apparatus 1, the switching claw 57 switches the conveyance passages to direct the sheet P toward a receptacle 61 via a binding conveyance passage K12. Thus, the sheets P rest on the receptacle 61 as a bundle of sheets PT. A sheet aligning unit 60 aligns the bundle of sheets PT in a conveying direction of the sheets P and a width direction perpendicular to the conveying direction of the sheets P. Note that, the conveying direction of the sheets P is hereinafter simply referred to as a sheet conveying direction.

Specifically, when each sheet P of the bundle of sheets PT is placed on a placement surface of the receptacle 61, a tapping roller 56 disposed above the receptacle 61 rotates about an axis from a retracted position to a position where the tapping roller 56 contacts an uppermost sheet P of the bundle of sheets PT. Then, the tapping roller 56 is rotated in the counterclockwise direction in FIG. 1 to convey or move the uppermost sheet P toward the end fence 62. As a consequence, a trailing end in the sheet conveyance direction of each sheet P of the bundle of sheets PT strikes the end fence 62. Thus, the positions of the sheets P are aligned in the sheet conveyance direction. In other words, the position of the bundle of sheets PT is aligned in the sheet conveyance direction.

Relatedly, in the present embodiment, when each sheet P of the bundle of sheets P is placed on the placement surface of the receptacle 61, a stopper 64 held on a surface of a conveyor belt 65 moves so as to push the leading end of the sheet P as the conveyor belt 65 rotates in a clockwise direction in FIG. 1. Accordingly, the sheet P is conveyed or moved toward the end fence 62. As a consequence, a trailing end in the sheet conveyance direction of each sheet P of the bundle of sheets PT strikes the end fence 62. Thus, the positions of the sheets P are aligned in the sheet conveyance direction. In other words, the position of the bundle of sheets PT is aligned in the sheet conveyance direction.

Meanwhile, side fences (or jogger fences) disposed at opposed end portions in a width direction of the receptacle 61 moves in the width direction so as to sandwich the sheet P (or bundle of sheets PT) when each sheet P of the bundle of sheets P rests on the receptacle 61 (or after a desired number of sheets P lie stacked on the receptacle 61). Thus, the positions of the sheets P are aligned in the width direction. In other words, the position of the bundle of sheets PT is aligned in the width direction. As described above, the width direction is a direction perpendicular to the sheet conveying direction and the surface of the paper on which FIG. 1 is drawn.

A stapler 80 then binds the trailing ends of the sheets P (i.e., bundle of sheets PT) aligned by the sheet aligning unit 60 in the sheet conveying direction and the width direction.

The bundle of sheets PT (i.e., sheets P) thus bound moves obliquely upward along the inclination of the placement surface of the receptacle 61 as the stopper 64 serving as a release claw moves in a direction to eject the bundle of sheets PT. After passing through an output conveyance passage K13, the bundle of sheets PT is conveyed and ejected onto the output tray 59 by the output roller pair 58.

Note that, in a case in which the "punching" is additionally selected in advance by the user through the operation display panel 95 in the binding mode described above, the punching unit 70 sequentially punches the sheets P passing through the punching unit 70.

Referring now to FIGS. 1 and 2, a detailed description is now given of the conveying device 20 in the image forming apparatus 1 of the image forming system 100 according to the present embodiment.

FIG. 2 is a diagram of the storage 30 and surrounding components in the image forming apparatus 1.

In the image forming apparatus 1 of the present embodiment, the conveying device 20 is disposed adjacent to the sheet feeders 10 as illustrated in FIG. 1 to convey a sheet P, staying in the image forming apparatus 1 of the image forming system 100 due to, e.g., a paper jam, toward the storage 30 (i.e., purger). When a jammed sheet P is optically detected by at least one of a plurality of jam detection sensors disposed along the conveyance passages in the image forming system 100, such as a jam detection sensor disposed near the output roller pair 25 of the image forming apparatus 1 and a jam detection sensor disposed near the entrance roller pair 51 of the post-processing device 50, all sheets P staying in the conveyance passages and capable of reaching the storage 30 through the conveyance passages secured are conveyed toward the storage 30 by rotation of the conveyance roller pairs.

Note that such a control mode is hereinafter referred to as "purging" as appropriate.

Specifically, as illustrated in FIGS. 1 and 2, the conveying device 20 includes, e.g., the storage 30 (i.e., purger), the conveyance passage K4, the third switching claw 37 as a switcher, a first photosensor 42, and a second photosensor 44.

The storage 30 temporarily stores one or more sheets P to be removed without being used in the image forming apparatus 1, to prevent such sheets P from affecting an image forming operation of the image forming apparatus 1.

Specifically, the storage 30 is configured to stack and store a plurality of sheets P or a bundle of sheets PT. The sheets P staying in the image forming apparatus 1 are conveyed to the storage 30 one by one. The sheets P are removable, as a bundle of sheets PT, from the storage 30, that is, outside the image forming apparatus 1.

More specifically, with reference to FIG. 2, the storage 30 includes a storage guide 49, the second photosensor 44, and a stopper 31. The storage guide 49 is a curved guide plate that guides and stacks one or more sheets P conveyed. The second photosensor 44 is a sheet detector that detects whether the storage 30 stores one or more sheets P. The stopper 31 is a wall to align a bundle of sheets PT stacked on the storage guide 49.

The one or more sheets P (or bundle of sheets PT) stored in the storage 30 is removed from the image forming apparatus 1 by, e.g., a user as appropriate. Specifically, the user opens a door 32, which is an exterior part of the storage 30, and takes out the unnecessary bundle of sheets PT stacked on the storage guide 49 from the storage 30 thus revealed, to discard the bundle of sheets PT. Note that the user thus removes the one or more sheets P (or bundle of sheets PT) from the storage 30 in response to a message displayed on the screen 96 of the operation display panel 95. A detailed description of the removal is deferred.

As illustrated in FIGS. 1 and 2, the sheet P is conveyed along the conveyance passage K4 downward from above substantially in a vertical direction. Specifically, as illustrated in FIG. 2, the conveyance passage K4 is defined by a guide plate pair 48 (constructed of opposed guide plates) extending substantially in the vertical direction.

The storage guide 49 of the storage 30 has an upper starting point at a position leftward from a lower end of the guide plate pair 48 as illustrated in FIG. 2. In other words, the upper starting point of the storage guide 49 is located leftward from a lower end position of the conveyance passage K4 from which the sheet P is ejected. From the upper starting point, the storage guide 49 is curved downward to a position exceeding a position below the conveyance passage K4 in a vertical direction in FIG. 2.

That is, the storage guide 49 has an upper end located to the left of the lower end of the guide plate pair 48 of the conveyance passage K4. The storage guide 49 has a guide surface that extends downward substantially in the vertical direction from the position where the upper end of the storage guide 49 is located and then curves to the lower right in FIG. 2.

At an end point (i.e., lower right end) of the storage guide 49, the stopper 31 is disposed as a wall that rises upward substantially in the vertical direction in FIG. 2. The sheet P ejected from the conveyance passage K4 slides down to the end point (i.e., lower end position) of the storage guide 49 along the curved guide surface of the storage guide 49 (or another sheet P on the guide surface). When the leading end of the sheet P contacts the stopper 31, the posture of the sheet P is determined in the sheet conveying direction (i.e., sliding direction). Thus, a bundle of sheets PT is aligned. Accordingly, the user can take out the bundle of sheets PT reliably aligned from the storage 30.

The first photosensor 42 is disposed along the conveyance passage K4 to count the number of sheets P passing the first photosensor 42 and conveyed toward the storage 30. Specifically, each time the first photosensor 42 detects a sheet P conveyed along the conveyance passage K4 to the storage 30, a counter 93 of the controller 90 counts up the number of sheets P. The number of sheets P counted up by the counter 93 is cleared when the sheets P are removed from the storage 30.

In the storage 30, the second photosensor 44 is disposed below a light transmitting portion of the storage guide 49 to detect whether the storage 30 stores one or more sheets P. Specifically, the controller 90 determines whether one or more sheets P rest on the storage guide 49 based on whether the output of the second photosensor 44 is on or off.

With continued reference to FIGS. 1 and 2, a detailed description is now given of the configuration and operation of the image forming apparatus 1 in the image forming system 100 according to the present embodiment.

As described above with reference to FIGS. 1 and 2, the image forming apparatus 1 of the present embodiment includes the storage 30 that temporarily stores one or more sheets P to be removed without being used in the image forming apparatus 1, to prevent such sheets P from affecting an image forming operation (e.g., printing) of the image forming apparatus 1.

Specifically, the storage 30 stores the one or more sheets P purged and conveyed from a conveyance passage to the storage 30 after failing to be conveyed through the conveyance passage in the image forming apparatus 1 during an image forming operation (e.g., printing).

According to the present embodiment, the image forming apparatus 1 includes the controller 90 as illustrated in FIGS. 1 and 2. The controller 90 serves as a determiner that determines whether a given manual operation is performed on the image forming apparatus 1 and whether the one or more sheets P stored in the storage 30 exceed a given value A in number. Note that the manual operation is performed by directly touching the image forming apparatus 1.

The image forming apparatus 1 further includes the screen 96 of the operation display panel 95 as an information provider that provides information urging removal of the one or more sheets P from the storage 30 in response to determination by the controller 90 (i.e., determiner) that the given manual operation is performed and that the one or more sheets P stored in the storage 30 exceed the given value A in number.

In other words, in the present embodiment, the information urging removal of the one or more sheets P from the storage 30 is provided when the controller 90 as a determiner determines that the given manual operation is performed on the image forming apparatus 1 and that the one or more sheets P stored in the storage 30 exceed the given value A in number.

In the present embodiment, the screen 96 (i.e., information provider) of the operation display panel 95 as a display provides such information. That is, the image forming apparatus 1 includes a display to display the information urging removal of the one or more sheets P from the storage 30. Such information displayed on the screen 96 of the operation display panel 95 is, e.g., a message such as "Unnecessary sheets are accumulated in the storage. Please remove the sheets according to the procedure displayed on the screen".

Note that, in the present embodiment, the information urging removal of the one or more sheets P from the storage 30 is displayed as a text message, for example. However, the information is not limited to a text message. Alternatively, the information may be provided as an audio message or displayed in graphics.

According to the present embodiment, even in a case in which the storage 30 stores a large amount of sheets P, the image forming apparatus 1 may or may not provide the information urging removal of the sheets P from the storage 30, depending on whether the image forming apparatus 1 receives a command for recovery from a power saving state (hereinafter simply referred to as a recovery command) by a manual operation or through communication (i.e., transmission) from the personal computer 200 serving as a remote input device.

The "power saving state" herein refers to a state in which the image forming apparatus 1 enters a power saving mode. Specifically, the "power saving state" is a state in which the power consumption of the image forming apparatus 1 is controlled to be automatically reduced within a range not affecting significantly the startup of the image forming apparatus 1 when the image forming apparatus 1 is not used for a certain long time without the main power supply of the image forming apparatus 1 being turned off. In order to recover the image forming apparatus 1 from the power saving state, a user, for example, has two options to input the recovery command to the image forming apparatus 1. One is pressing (i.e., manually operating) the operation key 97 of the operation display panel 95 serving as an operation device. The other one is operating the personal computer 200 distanced from the image forming apparatus 1. Of the two options, the former is referred to as a "recovery command by manual operation"; whereas the latter is referred to as a "recovery command through communication".

Recovery of the image forming apparatus 1 from the power saving state provides a suitable time for removing sheets P from the storage 30, because the sheets P may be purged in association with the image forming operation after the recovery from the power saving state. However, in a case in which the information urging removal of the sheets P from the storage 30 is displayed on a screen of the personal computer 200 when the user operates the personal computer 200 distanced from the image forming apparatus 1 to enter the "recovery command through communication" and recover the image forming apparatus 1 from the power saving state, the user bothers to move from the position of the personal computer 200 to the position of the image forming apparatus 1 to remove the sheets P. The above-described inconvenient action of the user imposes time and physical burdens on the user. To address such a situation, in the present embodiment, the information urging removal of the sheets P from the storage 30 is provided on the screen 96 of the operation display panel 95 simply when the user is near the image forming apparatus 1 and directly operates the operation key 97 (i.e., operation device) of the image forming apparatus 1 to input the "recovery command by manual operation" to recover the image forming apparatus 1 from the power saving state.

Note that such information providing is hereinafter referred to as "sheet removal notification" as appropriate.

More specifically, as illustrated in FIGS. 1 and 2, the image forming apparatus 1 includes the operation display panel 95 and a reception unit 91. The operation display panel 95 serves as an operation device with which a command is input to the image forming apparatus 1 by a manual operation. The reception unit 91 receives a command to the image forming apparatus 1 through communication.

The information urging removal of the sheets P from the storage 30 is provided in response to determination by the controller 90 (i.e., determiner) that the recovery command is input by a manual operation of the operation display panel 95 (i.e., operation device) and that the sheets P stored in the storage 30 exceed the given value A in number. Note that the recovery command is a command for recovering the image forming apparatus 1 from the power saving state to cause the image forming apparatus 1 to perform an image forming operation.

By contrast, the information urging removal of the sheets P from the storage 30 is not provided in response to determination by the controller 90 (i.e., determiner) that the recovery command is received by the reception unit 91 through communication.

In other words, the "sheet removal notification" is issued not in response to the "recovery command through communication" but in response to the "recovery command by manual operation". Thus, the sheets P are removed from the storage 30 with enhanced work efficiency.

Accordingly, the present embodiment addresses an unfavorable situation in which the user bothers to move to the image forming apparatus 1 from a position away from the image forming apparatus 1 only to remove the sheets P from the storage 30.

As described above, the "sheet removal notification" is issued in response to the "recovery command by manual operation" when the number of sheets P stored in the storage exceed the given value A (e.g., 100).

As described above with reference to FIG. 2, the first photosensor 42 disposed along the conveyance passage K4 detects a sheet P passing the first photosensor 42 and conveyed toward the storage 30. Each time the first photosensor 42 detects a sheet P conveyed to the storage 30, the counter 93, serving as a measuring device, of the controller 90 counts up the number of sheets P. The number of sheets P thus counted is replaced with the number stored in a memory 92. Thus, a latest number of sheets P is stored in the memory 92. That is, when the controller 90 (i.e., determiner) determines that the number of sheets P stored in the memory 92 is greater than the given value A and confirms the "recovery command by manual operation", the "sheet removal notification" is displayed on the screen 96 of the operation display panel 95.

Note that the aforementioned "given value A" is preferably less than a maximum number of sheets P storable in the storage 30 in consideration of various margins.

As described above, in the present embodiment, the "sheet removal notification" is issued when the controller 90 determines that the one or more sheets P stored in the storage 30 exceed the given value A in number. Alternatively, the "sheet removal notification" may be issued when the controller 90 determines that the one or more sheets P stored in the storage 30 exceed a given value H in height.

Specifically, a height sensor is disposed to directly or indirectly detect the height (in a stacking direction) of sheets P (i.e., bundle of sheets PT) stored in the storage 30. The "sheet removal notification" is issued when the controller 90 determines that the recovery command input is the "recovery command by manual operation" and that the height detected by the height sensor is greater than the given value H.

The height sensor is, e.g., a rangefinder that detects a distance of an uppermost sheet P of the sheets P stored in the storage 30 from the rangefinder, or a filler sensor that is pushed when the bundle of sheets PT stored in the storage 30 exceeds the given value H in height.

Figure 3:
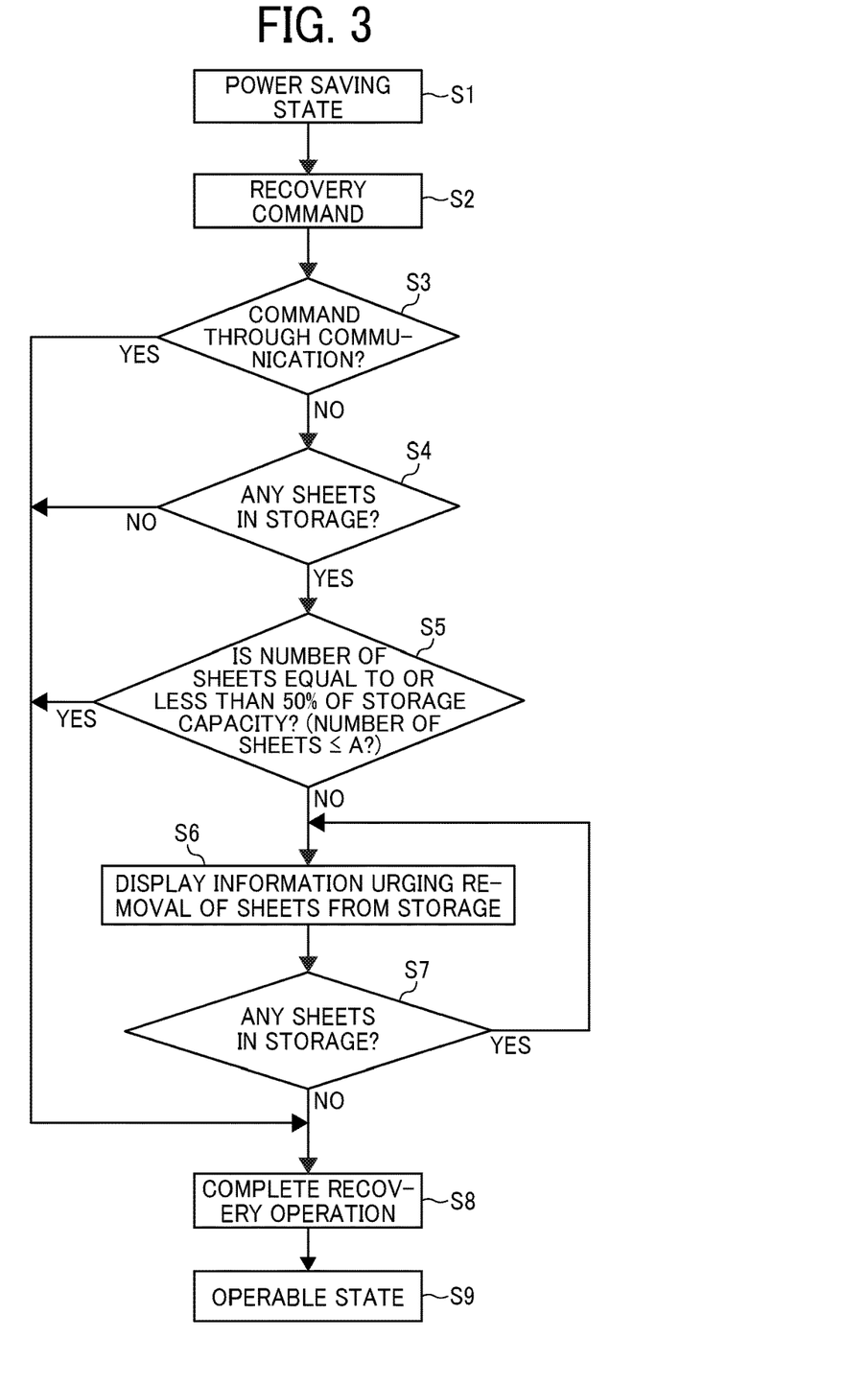
FIG. 3 is a flowchart of control for providing information urging removal of sheets from the storage.

Referring now to FIG. 3, a description is given of control for the "sheet removal notification" according to the present embodiment.

FIG. 3 is a flowchart of the control for providing information urging removal of sheets P from the storage 30 (i.e., "sheet removal notification").

In step S1, the image forming apparatus 1 is in the power saving state.

In step S2, a recovery command is input to the image forming apparatus 1.

In step S3, the controller 90 determines whether the recovery command is input through communication. When the controller 90 determines that the recovery command is input not through the operation display panel 95 (i.e., operation device), but through communication (YES in step S3), a recovery operation is completed without the "sheet removal notification" in step S8 to prevent a heavy burden on, e.g., a user. In step S9, the image forming apparatus 1 enters an operable state.

By contrast, when the controller 90 determines that the recovery command is input not through communication, but through the operation display panel 95 (i.e., operation device) by a manual operation (NO in step S3), the controller 90 then determines whether the storage 30 stores any sheets P in step S4. Specifically, the controller 90 determines whether the second photosensor 44 disposed in the storage 30 (as illustrated in FIGS. 1 and 2) detects one or more sheets P.

When the controller 90 determines that the storage 30 stores no sheet P (NO in step S4), the recovery operation is completed in step S8 as the storage 30 stores no sheet P to be removed. In step S9, the image forming apparatus 1 enters the operable state.

By contrast, when the controller 90 determines that the storage 30 stores one or more sheets P (YES in step S4), the controller 90 then determines whether the number of sheets P stored is equal to or less than the given value A in step S5. Specifically, the given value A is set to 50% of the maximum capacity (i.e., maximum number) of sheets P storable in storage 30. In other words, the controller 90 determines whether the number of sheets P is equal to or less than 50% of the storage capacity.

When the controller 90 determines that the number of sheets P is equal to or less than the given value A (YES in step S5), the recovery operation is completed in step S8 as the storage 30 still has a room for storing sheets P and therefore the sheet removal is deferrable. In step S9, the image forming apparatus 1 enters the operable state.

By contrast, when the controller 90 determines that the number of sheets P is greater the given value A (NO in step S5), the information urging removal of the one or more sheets P from the storage 30 is provided or displayed in step S6 as it is about time to remove the one or more sheets P from the storage 30.

In step S7, the controller 90 determines whether the storage 30 stores any sheets P. When the controller 90 determines that the storage 30 stores one or more sheets P (YES in step S7), the process returns to step S6. By contrast, when the controller 90 determines that the storage 30 stores no sheet P based on a result of detection by the second photosensor 44 (NO in step S7), that is, after the controller 90 confirms that the one or more sheets P are removed from the storage 30, the recovery operation is completed in step S8. In step S9, the image forming apparatus 1 enters the operable state.

Figure 4:
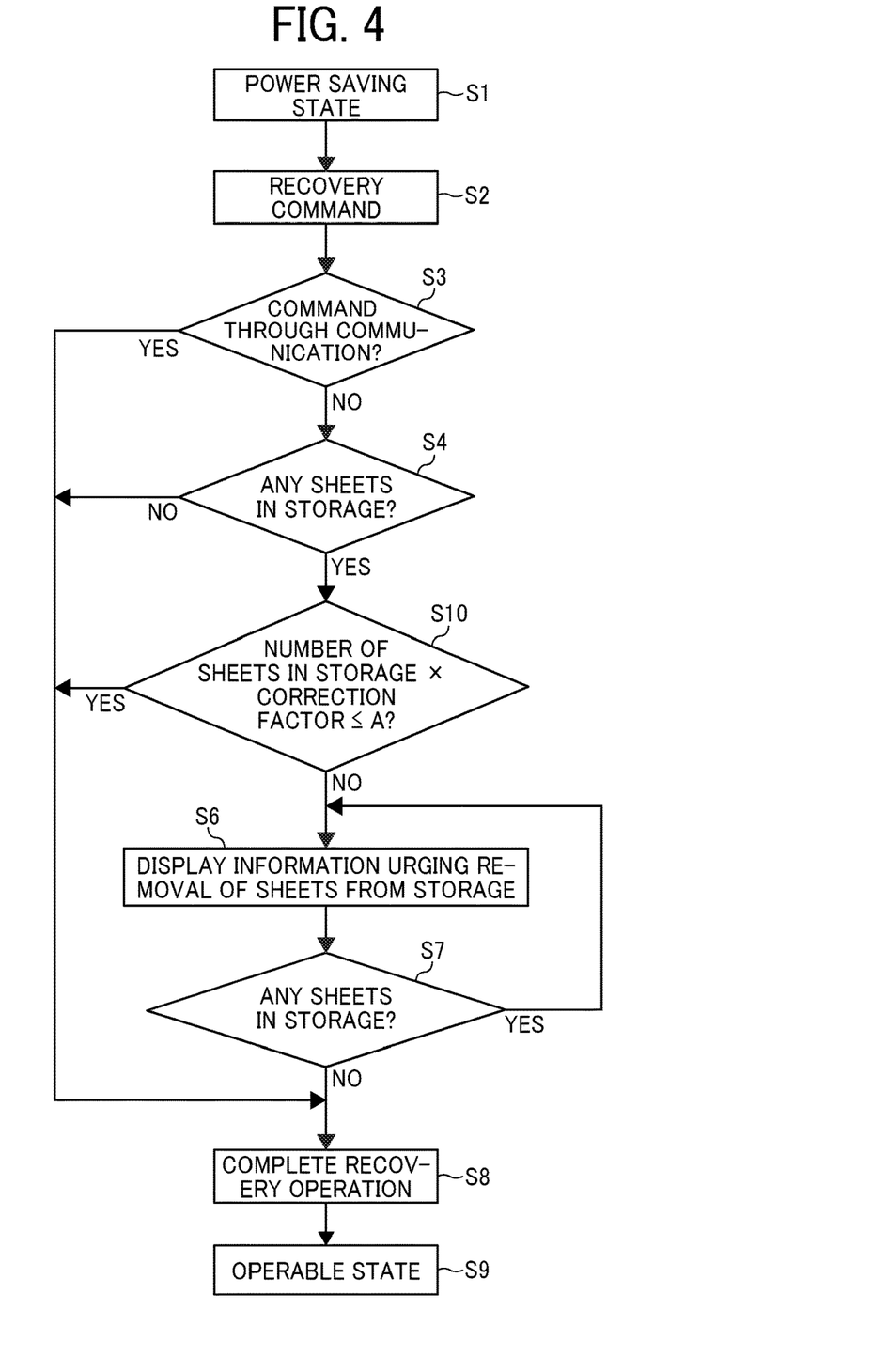
FIG. 4 is a flowchart of a first variation of the control for providing information urging removal of sheets from the storage.

Referring now to FIG. 4, a description is given of a first variation of the control for the "sheet removal notification".

FIG. 4 is a flowchart of the first variation of the control for providing information urging removal of sheets P from the storage 30 (i.e., "sheet removal notification") described above with reference to FIG. 3.

In the first variation, the controller 90 as a determiner multiplies the number of sheets P stored in the storage 30 by a correction factor based on at least one of the size and the thickness of the sheets P to determine whether the one or more sheets P stored in the storage exceed the given value A in number. Specifically, the controller 90 determines whether the number of sheets P in the storage 30 multiplied by the correction coefficient is greater than the given value A.

This is because large sheets P are more likely to fill the storage 30 than small sheets P when the large sheets P and the small sheets P are stored in the storage 30 separately in the same number. Similarly, thick sheets P are more likely to fill the storage 30 than thin sheets P when the thick sheets P and the thin sheets P are stored in the storage 30 separately in the same number. Therefore, in a case in which large sheets P or thick sheets P are stored in the storage 30, the correction factor is multiplied such that the apparent number of sheets P is greater than the actual number of sheets P. Thus, the "sheet removal notification" is issued under the same conditions with respect to the maximum capacity of the storage 30.

Specifically, as illustrated in FIG. 4, the controller 90 determines whether the number obtained by multiplying the actual number of sheets P by the correction factor is equal to or less than the given value A in step S10, instead of the determination in step S5 of FIG. 3.

When the controller 90 determines that the number is greater than the given value A (NO in step S10), the process proceeds to step S6, which is followed by steps S7 to S9. By contrast, when the controller 90 determines that the number is equal to or less than the given value A (YES in step S10), the process proceeds to step S8, which is followed by step S9.

Note that the actual number of sheets P stacked in the storage 30 is a value counted based on the detection by the first photosensor 42 and stored in the memory 92, as in the present embodiment. The size and the thickness of the sheets P are obtainable based on the information of the sheets P input by, e.g., a user to the operation display panel 95 or the personal computer 200. Alternatively, the size and the thickness of the sheets P are obtainable based on results of detection by a size detection sensor and a thickness detection sensor that directly detect the size and thickness of the sheets P, respectively. A calculation unit 94 of the controller 90 multiplies the number of sheets P stored in the memory 92 by the correction factor, which is preliminarily tabulated, based on the size and the thickness of the sheets P thus obtained. The controller 90 determines whether the multiplication result is equal to or less than the given value A.

In the first variation, as in the present embodiment, the sheets P are removed from the storage 30 with enhanced work efficiency. Particularly in the first variation, the "sheet removal notification" is issued under almost the same conditions with respect to the maximum capacity of the storage 30, regardless of the size and the thickness of the sheets P stored in the storage 30.

Figure 5:
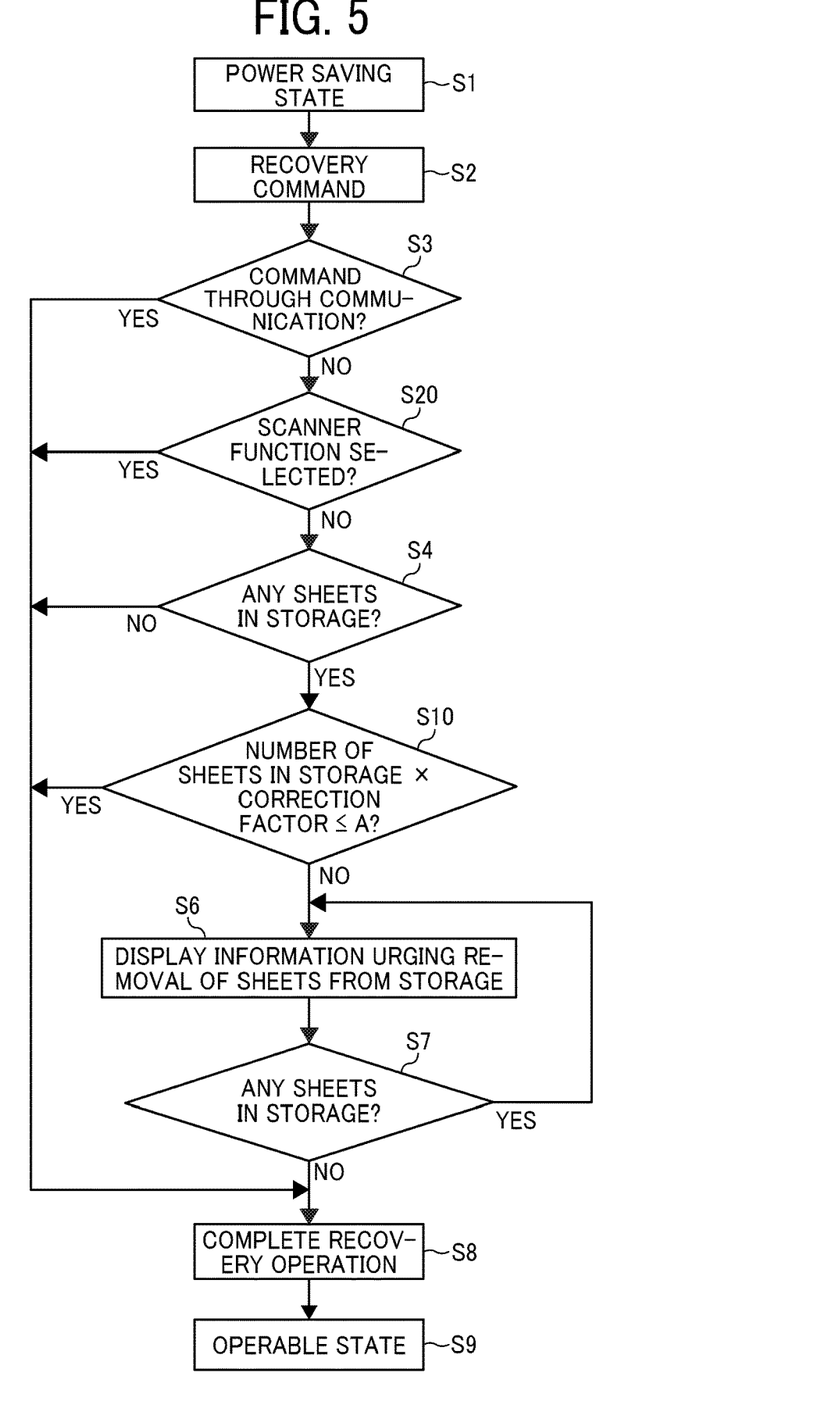
FIG. 5 is a flowchart of a second variation of the control for providing information urging removal of sheets from the storage.

Referring now to FIG. 5, a description is given of a second variation of the control for the "sheet removal notification".

FIG. 5 is a flowchart of the second variation of the control for providing information urging removal of sheets P from the storage 30 (i.e., "sheet removal notification") described above with reference to FIG. 3.

Similar to the image forming apparatus 1 according to the present embodiment, one of the copying, printing and scanning functions (also referred to as a copier function, a printer function, and a scanner function) is selectable by a manual operation of the image forming apparatus 1 according to the second variation. Specifically, a user, for example, operates a touch button displayed on the screen 96 of the operation display panel 95 to select one of the copying, printing and scanning functions (i.e., copier function, printer function, and scanner function). For example, in a case in which the image forming apparatus 1 functions simply as a scanner (i.e., image reader) without printing, the user operates the touch button to select the scanner function.

In the second variation, the information urging removal of sheets P from the storage is not provided in response to determination by the controller 90 (i.e., determiner) that the scanner function is selected by a manual operation. By contrast, when the controller 90 determines that either the copier function or the printer function is selected by a manual operation and that the sheets P stored in the storage 30 exceed the given value A in number (or given value H in height), the information urging removal of the sheets P from the storage 30 is provided.

Such control is performed because, in a case in which the scanner function is executed, no sheet P is conveyed and therefore the number of sheets P stored in the storage 30 remains unchanged.

Specifically, in the control flow illustrated in FIG. 5, step S20 is inserted between steps S3 and S4 of the flow illustrated in FIG. 4.

In step S20, the controller 90 determines whether the scanner function is selected. When the controller 90 determines that the scanner function is selected (YES in step S20), the process proceeds to step S8, which is followed by step S9. By contrast, when the controller 90 determines that the scanner function is not selected (NO in step S20), the process proceeds to step S4, which is followed by steps S10, S6, S7, S8, and S9 in this order.

In the second variation, as in the present embodiment, the sheets P are removed from the storage 30 with enhanced work efficiency.

Figure 6:
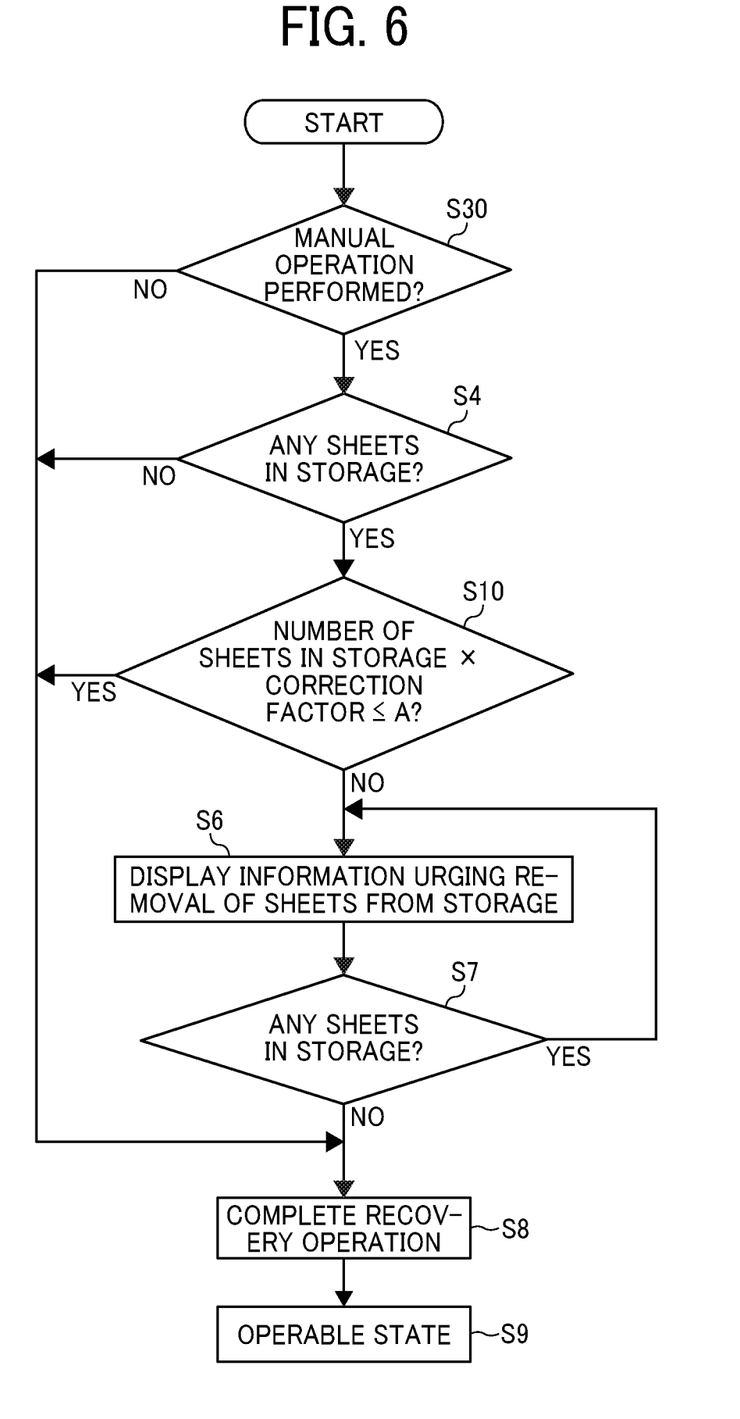
FIG. 6 is a flowchart of a third variation of the control for providing information urging removal of sheets from the storage.

Referring now to FIG. 6, a description is given of a third variation of the control for the "sheet removal notification".

FIG. 6 is a flowchart of the third variation of the control for providing information urging removal of sheets P from the storage 30 (i.e., "sheet removal notification") described above with reference to FIG. 3.

In the third variation, the information urging removal of sheets P from the storage 30 is provided when the sheets P stored in the storage 30 exceed the given value A in number (or given value H in height) and when a manual operation (i.e., operation by directly touching the image forming apparatus 1) is performed. Note that the manual operation is not limited to an operation of recovering the image forming apparatus 1 from the power saving state. The manual operation may be another operation. For example, the manual operation may be opening or closing a housing door of the image forming apparatus 1 or replenishing the sheet feeders 10 with new sheets P. Note that the replenishing is detectable by inward or outward movement of the sheet feeders 10.

Specifically, steps S1 to S3 of the flow illustrated in FIG. 4 is replaced with step S30 in the control flow illustrated in FIG. 6.

In step S30, the controller 90 determines whether a manual operation is performed. When the controller 90 determines that the manual operation is performed (YES in step S30), the process proceeds to step S4, which is followed by steps S10, S6, S7, S8, and S9 in this order. By contrast, when the controller 90 determines that the manual operation is not performed (NO in step S30), the process proceeds to step S8, which is followed by step S9.

In the third variation, as in the present embodiment, the sheets P are removed from the storage 30 with enhanced work efficiency.

Figure 7:
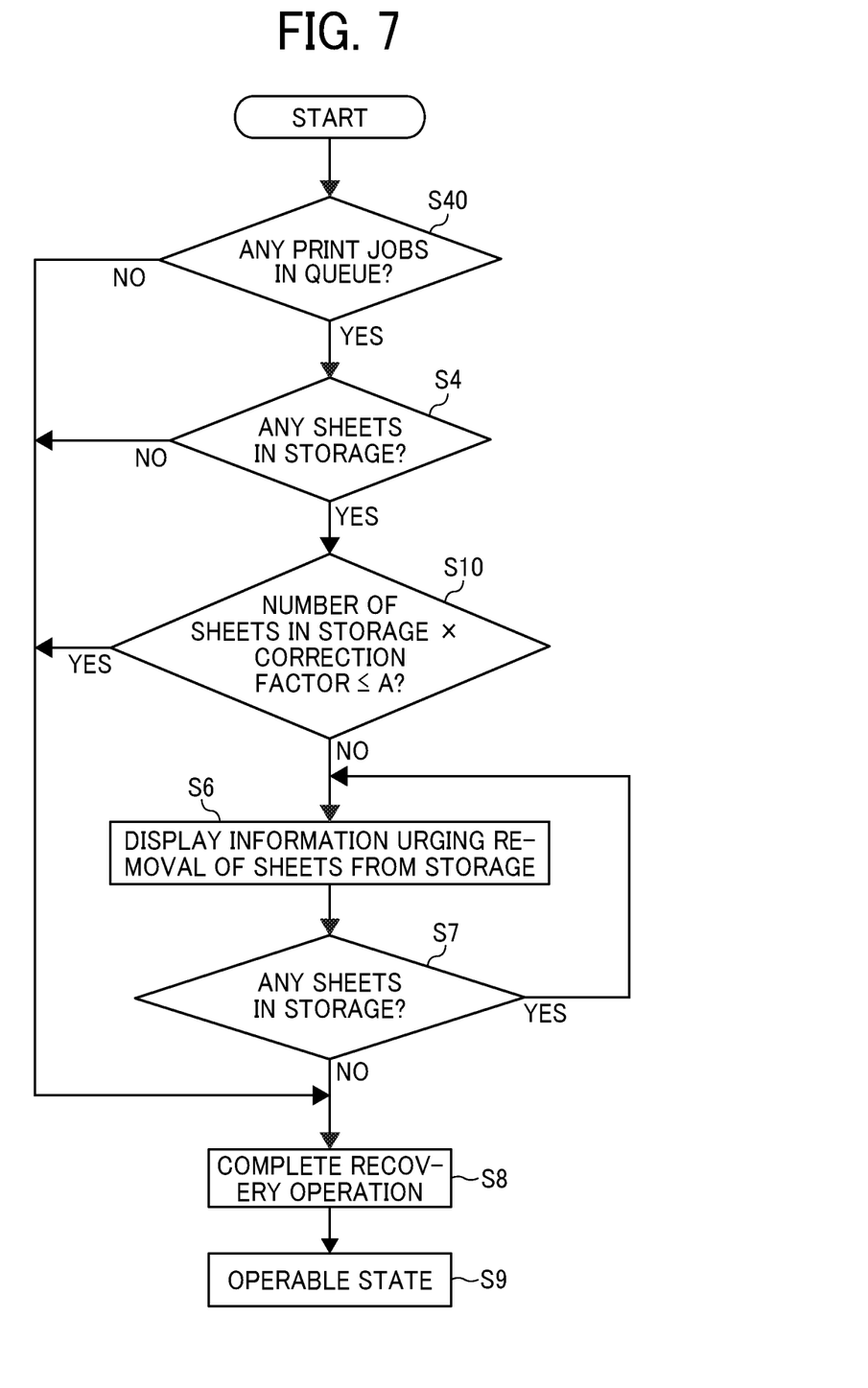
FIG. 7 is a flowchart of a fourth variation of the control for providing information urging removal of sheets from the storage.

Referring now to FIG. 7, a description is given of a fourth variation of the control for the "sheet removal notification".

FIG. 7 is a flowchart of the fourth variation of the control for providing information urging removal of sheets P from the storage 30 (i.e., "sheet removal notification") described above with reference to FIG. 3.

According to the fourth variation, a sequence of image forming operations (i.e., print jobs) is reservable in the image forming apparatus 1. Specifically, a user, for example, operates the operation display panel 95 or the personal computer 200 to reserve a plurality of print jobs in advance. The print jobs thus reserved are stored in the memory 92 and then deleted from the memory 92 one by one after being executed.

In the fourth variation, the information urging removal of sheets P from the storage is provided in response to determination by the controller 90 (i.e., determiner) that one or more of the sequence of image forming operations reserved are in queue and that the sheets P stored in the storage 30 exceed the given value A in number (or given value H in height). In other words, "the sheet removal notification" is provided when one or more unexecuted print jobs are stored in the memory 92 and when a certain number of sheets P are stored in the storage 30.

Such control is performed because, when a print job in queue is executed, a user, for example, may certainly obtain a printed material from the image forming apparatus 1. Removing the sheets P from the storage 30 in addition to obtaining the printed material does not impose a burden on the user.

Specifically, steps S1 to S3 of the flow illustrated in FIG. 4 is replaced with step S40 in the control flow illustrated in FIG. 7.

In step S40, the controller 90 determines whether unexecuted printing (i.e., image forming operation) awaits processing. In other words, the controller 90 determines whether any print jobs are in queue in step S40. When the controller 90 determines that one or more print jobs are in queue (YES in step S40), the process proceeds to step S4, which is followed by steps S10, S6, S7, S8, and S9 in this order. By contrast, when the controller 90 determines that no print job is in queue (NO in step S40), the process proceeds to step S8, which is followed by step S9.

In the fourth variation, as in the present embodiment, the sheets P are removed from the storage 30 with enhanced work efficiency.

As described above, the image forming apparatus 1 of the present embodiment includes the storage 30 that temporarily stores one or more sheets P to be removed without being used in the image forming apparatus 1, to prevent such sheets P from affecting an image forming operation (e.g., printing) of the image forming apparatus 1. The information urging removal of the one or more sheets P from the storage 30 is provided when the controller 90 (i.e., determiner) determines that a given manual operation is performed on the image forming apparatus 1 and that the one or more sheets P stored in the storage 30 exceed the given value A in number (or given value H in height).

Accordingly, the one or more sheets P are removed from the storage 30 with enhanced work efficiency.

Note that the present embodiment and the variations are applied to the color image forming apparatus 1. Alternatively, the present embodiment and the variations may be applied to a monochrome image forming apparatus that forms monochrome images on recording media.

The present embodiment and the variations are applied to the image forming system 100 that includes the post-processing device 50 and the image forming apparatus 1. Alternatively, the present embodiment and the variations may be applied simply to the image forming apparatus 1 without the post-processing device 50.

The present embodiment and the variations are applied to the electrophotographic image forming apparatus 1. Alternatively, the present embodiment and the variations may be applied to another type of image forming apparatus such as an inkjet image forming apparatus or a stencil printer.

Any of the cases described above exhibits substantially the same advantages as the advantages of the present embodiment.

In the present embodiment, the controller 90 (i.e., determiner) determines whether a given manual operation is performed on the image forming apparatus 1 and whether one or more sheets P stored in the storage 30 exceed the given value A in number (or given value H in height). The screen 96 (i.e., information provider) of the operation display panel 95 provides information urging removal of the one or more sheets P from the storage 30 in response to determination by the controller 90 (i.e., determiner) that the given manual operation is performed and that the one or more sheets P stored in the storage 30 exceed the given value A in number (or given value H in height).

Alternatively, the controller 90 (i.e., determiner) may determine whether a given manual operation is performed on the image forming apparatus 1 and whether one or more sheets P are stored in the storage 30. In this case, when the controller 90 (i.e., determiner) determines that the given manual operation is performed and that one or more sheets P are stored in the storage 30, the screen 96 (i.e., information provider) of the operation display panel 95 provides the information urging removal of the one or more sheets P from the storage 30. Specifically, the control flow of FIG. 3 omits step S5. That is, based on the determination in step S4, the controller 90 determines whether to provide the information urging removal of the one or more sheets P from the storage 30. Similarly, the control flows of FIGS. 4 to 7 omit step S10. That is, based on the determination in step S4, the controller 90 determines whether to provide the information urging removal of the one or more sheets P from the storage 30.

In other words, the information urging removal of the one or more sheets P from the storage 30 is provided in response to determination by the controller 90 (i.e., determiner) that the recovery command is input by a manual operation of the operation display panel 95 (i.e., operation device) and that the one or more sheets P are stored in the storage 30. Note that, as described above, the recovery command is a command for recovering the image forming apparatus 1 from the power saving state to cause the image forming apparatus 1 to perform an image forming operation. By contrast, the information urging removal of the one or more sheets P from the storage 30 is not provided in response to determination by the controller 90 (i.e., determiner) that the recovery command is received by the reception unit 91 through communication.

This case exhibits substantially the same advantages as the advantages of the present embodiment. In this case, providing the first photosensor 42 and the counter 93 are omittable. Accordingly, the image forming apparatus 1 can be manufactured at reduced cost and simplified.

Note that the sheet P is herein defined as any sheet-like recording medium, such as general paper, coated paper, label paper, overhead projector (OHP) transparency, or a metal sheet.

According to the embodiments described above, sheets are removed from a storage of an image forming apparatus with enhanced work efficiency.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Any one of the above-described operations may be performed in various other ways, for example, in an order different from that described above.

Any of the above-described devices or units can be implemented as a hardware apparatus, such as a special-purpose circuit or device, or as a hardware/software combination, such as a processor executing a software program.

Further, each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

What is claimed is:

1. An image forming apparatus comprising:
 a purged sheet storage configured to temporarily store one or more sheets to be removed without being used in the image forming apparatus;
 a sensor to detect whether the one or more sheet stored in the purged sheet storage exceed a threshold number of sheets;
 a user input element located on the image forming apparatus to receive a command for the image forming apparatus by a physical touch of a user;
 a display on the image forming apparatus to display a message for the user; and
 circuitry configured, in response to determining that the command is received via the physical touch of the user input element and further determining that the threshold number of sheets for the purged sheet storage is exceeded, to direct the display to show a message for the user to remove the one or more sheets from the purged sheet storage,
 wherein the circuitry is configured to receive the command to the image forming apparatus through communication,
 wherein the command includes a recovery command to recover the image forming apparatus from a power saving state to cause the image forming apparatus to perform an image forming operation,
 wherein the circuitry is configured to direct the display to show the message in response to a determination that the recovery command is input via the physical touch of the user input element and that the one or more sheets stored in the purged sheet storage exceed the threshold number of sheets, and
 wherein the circuitry is configured to direct the display not to show the message in response to a determination that the recovery command is received through communication.

2. The image forming apparatus according to claim 1, wherein the circuitry is configured to multiply a number of the one or more sheets stored in the purged sheet storage by a correction factor based on at least one of a size and a thickness of the one or more sheets to determine whether the one or more sheets stored in the purged sheet storage exceed the threshold number of sheets.

3. The image forming apparatus according to claim 1, wherein one of a copier function, a printer function, and a scanner function is selectable via the user input element, and
 wherein the circuitry is configured to direct the display to not show the message in response to a determination by the circuitry that the scanner function is selected via the user input element.

4. The image forming apparatus according to claim 1, wherein a sequence of image forming operations is reservable, and
 wherein the circuitry is configured to direct the display to show the message in response to a determination that one or more of the sequence of image forming operations reserved are in queue and that the one or more sheets stored in the purged sheet storage exceed the threshold number of sheets.

5. The image forming apparatus according to claim 1, wherein the purged sheet storage is configured to store the one or more sheets purged and conveyed from a conveyance passage to the purged sheet storage after failing to be conveyed through the conveyance passage in the image forming apparatus during an image forming operation.

6. An image forming apparatus comprising:
a purged sheet storage configured to temporarily store one or more sheets to be removed without being used in the image forming apparatus;
a sensor to detect whether the one or more sheet stored in the purged sheet storage exceed a threshold number of sheets;
a user input element located on the image forming apparatus to receive a command for the image forming apparatus by a physical touch of a user;
a display on the image forming apparatus to display a message for the user; and
circuitry configured, in response to detecting the command via the physical touch of the user input element, to determine whether the threshold number of sheets for the purged sheet storage is exceeded,
the circuitry further configured, in response to determining the threshold number of sheets for the purged sheet storage is exceeded, to direct the display to show a message for the user to remove the one or more sheets from the purged sheet storage,
wherein the circuitry is configured to receive the command to the image forming apparatus through communication,
wherein the command includes a recovery command to recover the image forming apparatus from a power saving state to cause the image forming apparatus to perform an image forming operation,
wherein the circuitry is configured to direct the display to show the message in response to a determination that the recovery command is input via the physical touch of the user input element and that the one or more sheets stored in the purged sheet storage exceed the threshold number of sheets, and
wherein the circuitry is configured to direct the display not to show the message in response to a determination that the recovery command is received through communication.

* * * * *